(12) United States Patent
Milner

(10) Patent No.: US 6,424,474 B1
(45) Date of Patent: Jul. 23, 2002

(54) OPTICAL REAR VIEW SYSTEM

(75) Inventor: Peter James Milner, Hinckley (GB)

(73) Assignee: Bending Light Ltd. (GB)

( * ) Notice: Subject to any disclaimer, the term of this patent is extended or adjusted under 35 U.S.C. 154(b) by 0 days.

(21) Appl. No.: 09/367,988

(22) PCT Filed: Feb. 20, 1998

(86) PCT No.: PCT/GB98/00550
§ 371 (c)(1),
(2), (4) Date: Nov. 9, 1999

(87) PCT Pub. No.: WO98/36942
PCT Pub. Date: Aug. 27, 1998

(30) Foreign Application Priority Data

Feb. 21, 1997 (GB) ................................. 9703687

(51) Int. Cl.⁷ ................................................. G02B 5/04
(52) U.S. Cl. .......................... 359/831; 359/832; 359/833
(58) Field of Search ..................... 359/831, 833, 359/837, 737, 402, 832, 850, 838

(56) References Cited

U.S. PATENT DOCUMENTS 3,806,233 A  * 4/1974 Stefane ........................ 359/872
5,594,593 A  * 1/1997 Milner ........................ 359/838
5,617,245 A  * 4/1997 Milner ........................ 359/837
5,914,815 A  * 6/1999 Bos ............................ 359/871

FOREIGN PATENT DOCUMENTS

DE       31 46 486       * 11/1981

* cited by examiner

Primary Examiner—Mohammad Sikder
(74) Attorney, Agent, or Firm—Gifford, Krass, Groh, Sprinkle, Anderson & Citkowski, P.C.

(57) ABSTRACT

A low profile rearview mirror for a motor vehicle having a first refractor with a first refractive index and a first chromatic dispersive poser. The first refractor is disposed in a housing on the exterior of the vehicle A reflector mounted partially within the motor vehicle extends into the housing for the first refractor and the retractor is positioned to receive and reflect light from objects behind the vehicle passing through the first refractor. A second refractor having a second refractive index and a second chromatic dispersive power is mounted between the first refractor and the reflector and the first and second refractors have complementary properties of chromatic dispersion.

10 Claims, 5 Drawing Sheets

OPTICAL REAR VIEW SYSTEM

BACKGROUND OF THE INVENTION

I. Field of the Invention

The present invention relates generally to an optical rear view system and particularly, but not exclusively to an optical system suitable for use as a motor vehicle rear view mirror.

II. Description of the Related Art

As used in this specification the term "motor vehicle" will be understood to refer to any form of vehicle, including watercraft and aircraft as well as motor land vehicles.

Motor vehicle rear view mirrors are essentially required to provide a vehicle operator or user charged with the task of directing the movement of the vehicle, with a readily available source of information concerning the region to the rear of the vehicle. Traditionally motor cars and other road vehicles, as well as aircraft and, to some extent, watercraft, are provided with plane reflectors positioned above and to one side of the driver's line of sight so that, by displacing his attention momentarily from the view ahead, a driver is able to view the region behind him. A traditional rear view mirror positioned within the passenger compartment provides a driver with a view through the rear screen or back window of the vehicle but this provides a field of view which is too limited, particularly in view of the vehicle's own rear pillars which obstruct the view, and the main internal rear view mirror is often supplemented with others. Some attempts have been made to expand the field of view by the provision of periscope-type contrivances having sets of reflectors and/or refractors mounted in the vehicle's roof so that a view can be obtained over the top of the vehicle and therefore unobstructed by the roof-supporting pillars of the vehicle. Such arrangements have not found favour, partly because of the expense of modifying a motor vehicle, and partly because the roof, being an important structural member involved in maintaining the "stiffness" of the vehicle body, considerable additional design effort is required to introduce such an arrangement. Furthermore, the fashion for sunroofs which can slide open and which inevitably involve a component projecting above the roof line, militate against the introduction of such arrangements.

Other attempts to supplement the driver's rear view include the provision of plane or curved mirrors mounted outside the vehicle, typically on the vehicle's front doors which can be viewed by the driver through the vehicle side door windows. These additional so-called "door" mirrors have found almost universal acceptance and are now designed into almost every new vehicle. Door mirrors provide a good rearward vision outside the vehicle to either side thereof making it possible to observe both overtaking and overtaken vehicles. Conventional door mirrors do, however, have certain disadvantages. In order to obtain an appropriate field of view they must project from the maximum exterior body line by as much as 20 cm (often more), and lateral projections of this magnitude represent a considerable physical hazard. Although they are mounted in a releasable manner, the inertia of such elements at high speeds makes them nevertheless a considerable danger. Air resistance due to the increased frontal cross-sectional area of the vehicle also accounts for significant additional fuel consumption and, being positioned right at the furthermost extremities of the lateral extent of the vehicle the driver's view must be diverted from the straight ahead position through a considerable angle in order to gain a view to the rear door mirror.

The Applicant's own earlier British Patent No. 2 254 832 and European Patent (UK) No. 0 402 444 describe optical systems which assist in overcoming the disadvantages of conventional rear view door mirrors. In particular, they provide optical systems of low lateral projection which, therefore, do not increase the frontal cross-sectional area of the vehicle to any large extent, and also provide for the view through the rear view mirror to be inboard of the driver's door and the front passenger door so that the angle through which the driver's head must be turned in order to gain a view to the rear of the vehicle through the door mirrors is less than it would be with conventional door mirrors.

SUMMARY OF THE INVENTION

According to one aspect of the present invention, there is provided an optical rear view system of the type comprising first and second refractors and a reflector in the path of light from an object to an observer, in which the refractors have complementary properties of chromatic dispersion and both refractors are positioned in advance of the reflector in the path of light from an object to an observer.

A major advantage of arranging the components in the above-defined configuration is experienced at low levels of illumination, such as during nighttime driving when the headlights of following vehicles may cause discomfort to the driver of a vehicle in front equipped with conventional rear view mirrors or, more seriously, may even cause loss of vision by dazzling.

In one embodiment of the invention the refractors are prisms oriented with their apices in opposite directions from one another. The reflector may be a plane or curved silvered reflector or a reflector acting by total internal reflection.

Preferably the refractors also have complementary properties as far as chromatic aberrations are concerned, that is the refractor reached second by light travelling from an object to the observer is shaped in such a way and made of such a material as at least partly to compensate for chromatic aberrations introduced by the refractor through which the light first passes. The refractor through which the light first passes will, hereinafter, be referred to as the "objective" refractor whilst the refractor through which the light passes subsequently will be called the "secondary" refractor.

It is preferred that the objective refractor is made of material having a relatively high refractive index and a relatively low chromatic dispersion in relation to those properties of the secondary refractor whilst this latter has, in relation to the objective refractor, a relatively low refractive index and a relatively high chromatic dispersion. Typically, the objective refractor may be made from an acrylic material whilst the secondary refractor may be made from a polycarbonate, these materials having very favourable relative chromatic properties which dominate the less favourable refractive index relationship. In practice the high chromatic power of polycarbonate permits chromatic aberration to be corrected using a secondary refractor of only half the apex angle of an objective refractor made, for example, of polymethyl methacrylate. The combination of apex angles and refractive indices thus makes the polycarbonate prism behave as if it had a smaller refractive index.

The objective and secondary refractors may be spaced from one another, parallel or inclined as appropriate, and may be formed as a substantially achromatic doublet. Indeed, as far as the geometric location of the secondary refractor is concerned, this may, in one configuration, be positioned at any point between an exit face of the objective refractor and the surface of the reflector. At the latter end of the range of possible positions in this configuration the secondary refractor may be traversed twice by light, that is first by light on its way to the reflector, and then again by light reflected by the reflector towards the observer. In a second configuration the secondary refractor may be positioned in one of a range of positions between the reflector and the observer. The relative inclinations of the refractor faces of the secondary refractor must, of course, be such as to secure appropriate chromatic compensations.

Another particularly important characteristic of the present invention is that the refractors may be formed as triangular prisms or as Fresnel prisms and in either case the angle of inclination between the incident and exit faces of the prisms may vary across the width of the prism. In the case of triangular "block" prisms this variation may be effected incrementally by forming a prism having a plurality of adjacently inclined flat elementary faces, or alternatively may be smoothly and continuously varied in inclination such that the refractors are effectively sections of cylindrical lenses. Indeed, it is not outside the scope of the present invention for the refractors to have varying inclination from top to bottom so that the refractors may be considered as sections of spherical or aspherical lenses which may be either convex, concave, meniscus, plano-convex or plano-concave.

The objective refractor may, furthermore, be made as a double-layer structure of two materials having different refractive index and or chromatic dispersion in order to provide an optical element having the required characteristics.

If the refractors are made as Fresnel prisms it is preferred that the Fresnel facets are in each case formed on only one face and that the said one faces are directed towards one another.

According to a second aspect of the present invention an optical rear view system for a vehicle comprises first and second refractors and a reflector in the path of light from an object to an observer, in which a first or objective refractor has a variation in its "power" (that is the angle through which a ray of light transmitted through the refractor is diverted) such as to divert light arriving at the system at a small angle to a predetermined longitudinal axis, and bound for the observer, through a greater angle than light arriving at the rear view system bound for the observer at a relatively higher angle to the said axis.

It is also within the ambit of the present invention to provide an optical rear view system as defined hereinabove in which the first or objective refractor has a first end nearer the reflector and a second end further from the reflector, and in which the said second end has opposing, that is incident and exit, faces inclined at a greater angle to one another than the corresponding angle between the same or corresponding faces at the first end of the first or objective refractor.

In a preferred embodiment the second refractor, which may be referred to as a secondary refractor, may be so formed as to divert light by a greater angle at one part than at another and may be so positioned and oriented that the said part which diverts light more greatly receives the more greatly diverted light from the objective refractor.

An optical rear view system formed in accordance with the principles of the present invention may have the said secondary refractor so formed that it varies in diverting power across its width from a first end nearer the reflector, which diverts light most, to a second end further from the reflector which diverts light least.

It is also within the ambit of the present invention to provide an optical rear view system as defined above in which the said second end of the secondary refractor diverts light in an opposite directional sense from the diversion introduced by the first end. In other words the variation in "power" of the refractor extends to either side of a zero power point at an intermediate position of the refractor.

If the refractors are made as Fresnel prisms adjacent facets may be inclined at angles differing from one another across the width of the prism. Likewise, as mentioned above, the facets may be so shaped as to provide diversion in other planes from that initially discussed, such that the refractors are in the form of Fresnel lenses rather than prisms. Strictly speaking, of course, the refractors will be part-lenses rather than complete lenses and may be cylindrical, spherical of aspherical lenses.

This allows a variation in the field of view to be achieved so that the field of view of the observer is appropriately enlarged or, at least maintained at full size, regardless of the particular configuration of the components in the vehicle.

Various embodiments of the present invention will now be more particularly described, by way of example, with reference to the accompanying drawings, in which:

DETAILED DESCRIPTION OF THE PREFERRED EMBODIMENTS OF THE INVENTION

Figure 1:
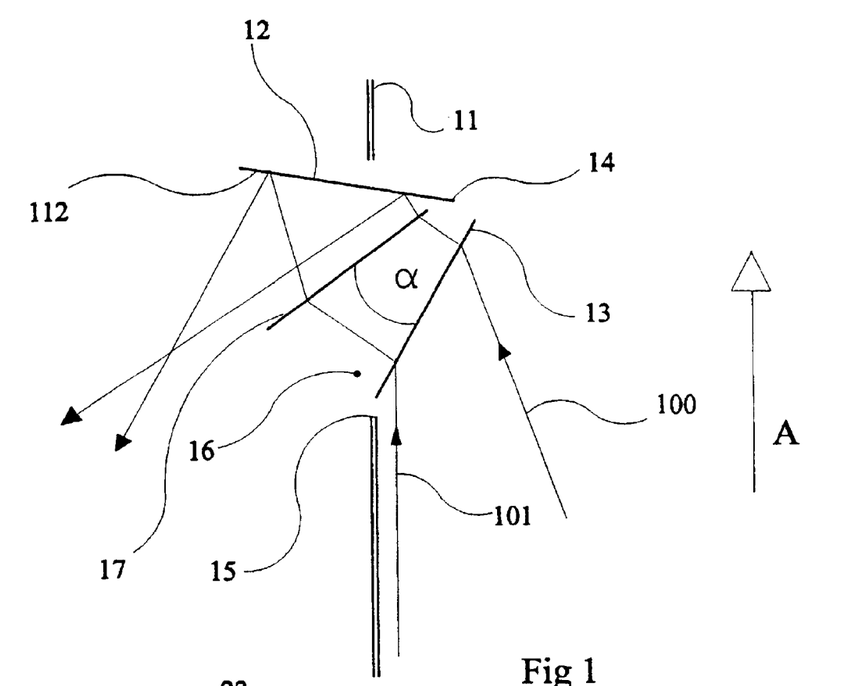
FIG. 1 is a schematic plan view from above of a first embodiment of the present invention.

Referring first to FIG. 1, a first embodiment of the invention formed as a rear view mirror for a motor vehicle is illustrated. The system is designed for a driver's side rear view mirror of a right hand drive vehicle and the line 11 represents the right hand envelope of the vehicle body whilst the arrow A identifies the forward direction.

Spanning the envelope line 11 is a reflector 12 which, of course, is suitably adjustable in orientation about two orthogonal axes in order to adjust to a driver's precise head position. Such adjustment may be manual or automatic driven by a linkage (not shown) or by motor means (also not shown) which may be suitably adapted from such mechanisms already on the market and used for adjusting the reflectors of conventional rear view door mirrors and which, for this reason, will not be described in more detail below.

An objective refractor generally indicated 13 extends from an outer edge 14 of the reflector 12 to a rear point 15 of an opening 16 in the vehicle side wall 11. The refractor 13 is illustrated as a Fresnel refractor (shown in more detail in FIG. 2) having generally parallel major opposite faces although, as will be appreciated, a triangular prism may equally well be used if it meets particular requirements. Between the objective refractor 13 and the reflector 12 is located a secondary refractor 17 inclined by an angle α to the objective refractor 13.

Figure 2:
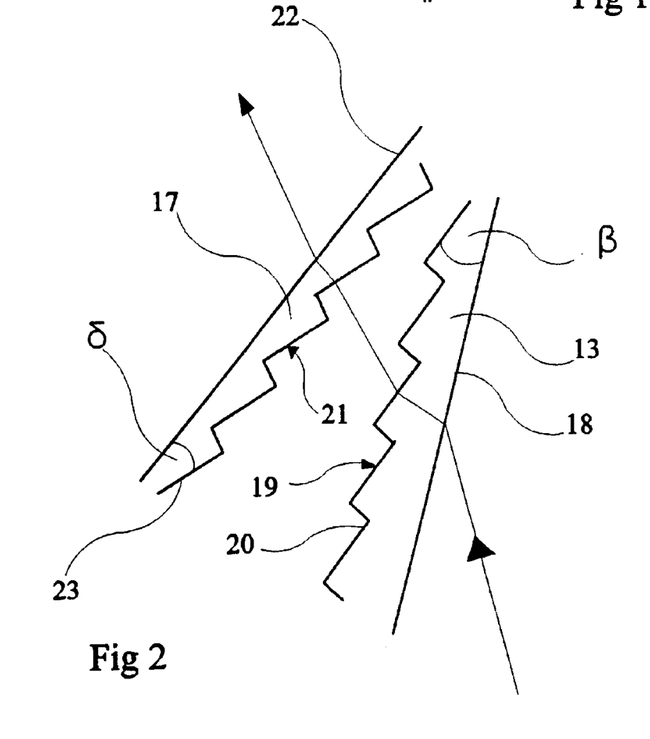
FIG. 2 is an enlarged view of a part of the embodiment of FIG. 1.

As can be seen in FIG. 2 the objective refractor 13 has a plane incident surface 18 and a faceted exit face 19 composed of a plurality of refractor facets 20 inclined at an angle β with respect to the incident surface 18 and converging with it in the forward direction as identified by the arrow A of FIG. 1. The secondary refractor 17 has an incident face generally indicated 21 and an exit face 22. The incident face 21 is a faceted Fresnel refractor face whilst the exit face 22 is a plane face. Facets 23 inclined at an angle δ to the exit face 22 converge rearwardly with it. The material from which the objective refractor 13 is composed may be an acrylic material whilst that from which the secondary refractor 17 is composed may be polycarbonate.

Figure 3:
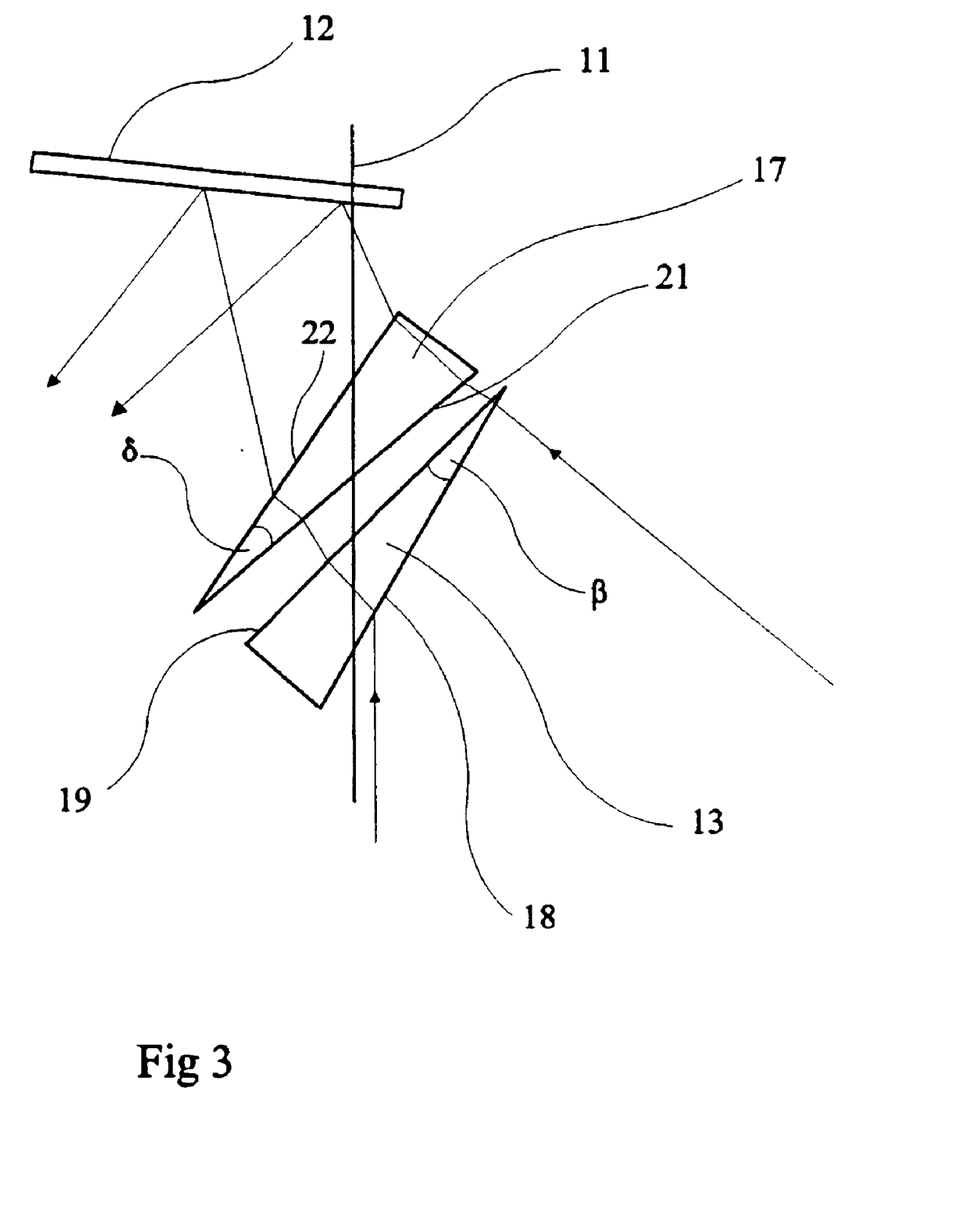
FIG. 3 is a plan view from above of a further embodiment of the invention.

In FIG. 3 there is shown a corresponding configuration using triangular prisms in which the same reference numerals have been used to identify the same or similar components or those which fulfil a corresponding function as those elements of FIGS. 1 and 2.

In order to minimise the length of the objective refractor 13 for a given width of the reflector 12, it is required to maximise the deviation of the light. This is achieved in part by making the apex angle β as large as possible. However, the passage of light through a large angle necessarily causes it to be subject to substantial chromatic dispersion which, if uncorrected, produces an image possessing the undesirable phenomenon of chromatic aberration. Dispersion is the splitting of light into its spectral (rainbow) colours, and chromatic aberration is manifest as coloured fringes in the image as a direct result of this dispersion. The principal tasks of the secondary refractor 17 is, therefore, to nullify the effect of dispersion produced by the objective refractor 13. In this regard the two refractors may together be likened to the well known achromat design for lenses.

This likeness is particularly useful as it aids appreciation of the choice of materials for the two refractors, which must possess contrasting optical properties; suitable materials are acrylic and polycarbonate, respectively. In both cases the chosen materials permit chromatic correction to be achieved while still preserving a net refractive diversion in the light after passage through the pair.

This diversion of light is fundamental to the function of the rear view unit in that it is what causes the inboard end of the reflector to be illuminated. As is clear from study of FIG. 1, wide spacing of the elements increased the inboard "throw" of light onto the reflector, due to the fact that the unavoidable "unbending" effect of the correcting prism occurs later than for closer refractor spacing.

In addition to the basic requirements of inward light deviation and dispersion control, the four refractions imposed on light that passes through the two refractor combine to generate effects which profoundly influence four important characteristics of the system, namely image magnitude (lateral and vertical); field of view (objet and image fields); image distortion and binocular alignment.

An understanding of how refractors can create such effects is aided by considering the relationship between the entry and exit properties of typical ray pairs passing through the system, see FIG. 1. Hereinafter the term local' image magnitude will be used because image magnitude generally varies across the field of view. In particular it should be noted that only angular relationships are of interest and ray location is irrelevant. The local image magnitude is a relationship between entry and exit conditions of a pair of rays, the properties of a single ray are not of interest. Moreover, local image magnitude is generally less than unity, and is generally less for narrow angle rays than for wide angle rays.

This of course refers only to properties in the plane of FIG. 1, i.e. the lateral properties of the system. Since prismatic action takes place only in this plane, the properties of the system perpendicular to the plane of FIG. 1 are unaffected by the refractors and are the same as for a conventional system.

A wide spacing of the two refractors produces a maximum inboard "throw" of the light and this is the configuration normally used when the design priority is to maximise image and object fields of view. If, however, achieving a large lateral image magnitude is the priority, then refractor spacing can be made smaller. The smallest possible separation, that is when the two prisms are in contact, produces the largest lateral image magnitude of slightly less than unity (when combined with a flat reflector). The additional increment of image magnitude needed to achieve unity, if it is required, may be provided by a small amount of cylindrical curvature applied to one or both prisms.

The image field of view (as distinct from the object field of view) is the angular size of the image, which in turn is a function of the physical size of the image on the reflector and the driver's distance from it. For a given reflector (assuming it is filled with image) at a given distance from the driver, the image field of view is fixed.

The reflector 12 may be of similar size to that found in a conventional rear view system, but is preferably sited a little closer to the driver, thereby offering the possibility of a slightly larger image field of view. In practice, however, this advantage may not be fully realised as the effective aperture of the system is often set by the objective refractor such that the reflector is not fully filled with image, as indicated in FIG. 1 by the part 112 of the refractor 12 which is outside the beam defined by the two limit rays 100, 101 illustrated.

The reason for this is to permit a degree of eye articulation (driver head movement) before the image begins to be cut off by misalignment between the aperture stops at the two ends of the system, that is the objective refractor 13 and the reflector 12.

The object field of view is the angular size of the object field and is a function of the image field of view and the mean image magnitude across it. Since the refractors influence the image magnitude, the object field of view is similarly influenced by them. Specifically, since the refractors reduce the lateral image magnitude they increase the lateral field of view.

The normal means used to increase the object field of view is a convex refractor, but the present invention offers the following advantages: First, the wider field of view is achieved by reducing the image magnitude in only the plane necessary, thereby leaving vertical information "uncorrupted" (for improved distance estimation) and minimising area shrinkage of the image. Secondly, the driver's eyes do not need to be refocused when switching to and from the mirror; this is quite different from the convex mirror image which requires eye focus to change rapidly from near infinity to only a few metres distant then back to near infinity again to observe the rear view and then change attention back to the forward view.

The only significant form of distortion it is possible for the prismatic system to introduce is known as lozenge distortion and it arises as a direct consequence of the different image magnitudes in the lateral and vertical planes. If the refractors are configured such that the lines defining their apex angles are effectively vertical, then the principal axis of prismatic action is horizontal and a rectangular object aligned with the horizon also appears as a rectangular image, albeit of a different aspect ratio as shown schematically in FIG. 4A.

Figure 4A:
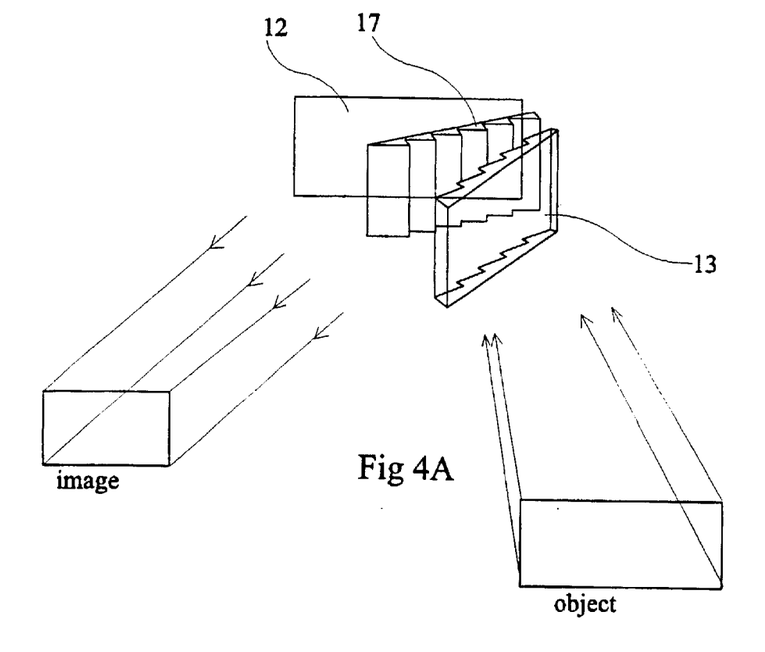
FIG. 4A is a schematic view of the embodiment of FIG. 1 illustrating the relationship between image and object shape.
Figure 4B:
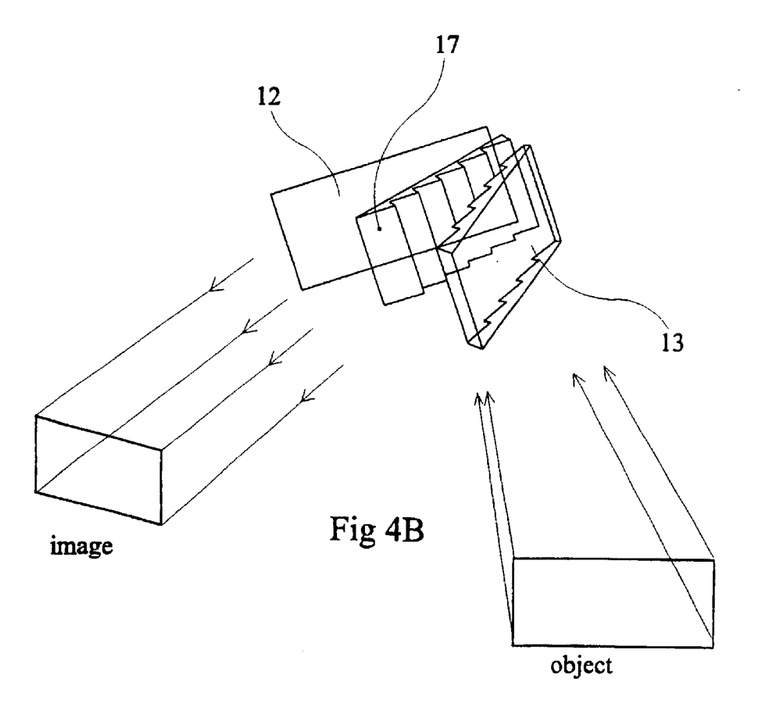
FIG. 4 is a corresponding view illustrating the relationship between image and object shape in an alternative configuration.

However, if the system is "rolled" inwards, as is often required by vehicle designers in order to blend the exterior prism surface with the tumblehome of the cabin glass, the result is an image that is a parallelogram, as shown in FIG. 4A. This effect may be understood by noting that the axis of prismatic contraction is now no longer horizontal, but in the example shown, approximately parallel to a diagonal of the object rectangle.

To counter this effect, the roll angle of the secondary refractor and the directions of the axes of the Fresnel grooves of both refractors may be varied from that shown in the drawings.

The width of reflectors in conventional door mirrors is normally at least twice the driver's inter-ocular distance. Such a width permits the possibility of a large central portion of the image field to be advantageously observed using binocular vision (i.e. both eyes simultaneously) but the driver is only able to do this if the directions of the two beams of light entering the eyes are related in a certain way. For normal vision eyes are accustomed to being aligned parallel, for viewing distant objects, or convergent for closer objects, but not divergent or vertically misaligned. In general, when presented with an optical system that demands such contortions, human observers have difficulty and report seeing double. The same phenomenon is perhaps most commonly experienced when viewing through misaligned field binoculars; the eyes are unable to transmit registered images to the brain which in turn is unable to identify and overlay the parts common to both. Because of the effects of the refractor the use of a spherically convex reflector introduces binocular vertical misalignment which must be closely controlled during the design stage. The same design parameters used to control image distortion are effective here, too, but care must be taken to avoid excessive conflict between the parameter demands of the two phenomena.

It is of some considerable significance that the configuration of optical components defined herein avoids the so-called "flare" problems and the problems of secondary reflections which is caused solely in other refractor configurations by the specific location of the secondary or ocular refractor especially those arrangements in which close proximity to the reflector is adopted. By relocating the secondary refractor to the position it occupies in the configurations defined herein the problem is eliminated.

Figures 5, 6, 7:
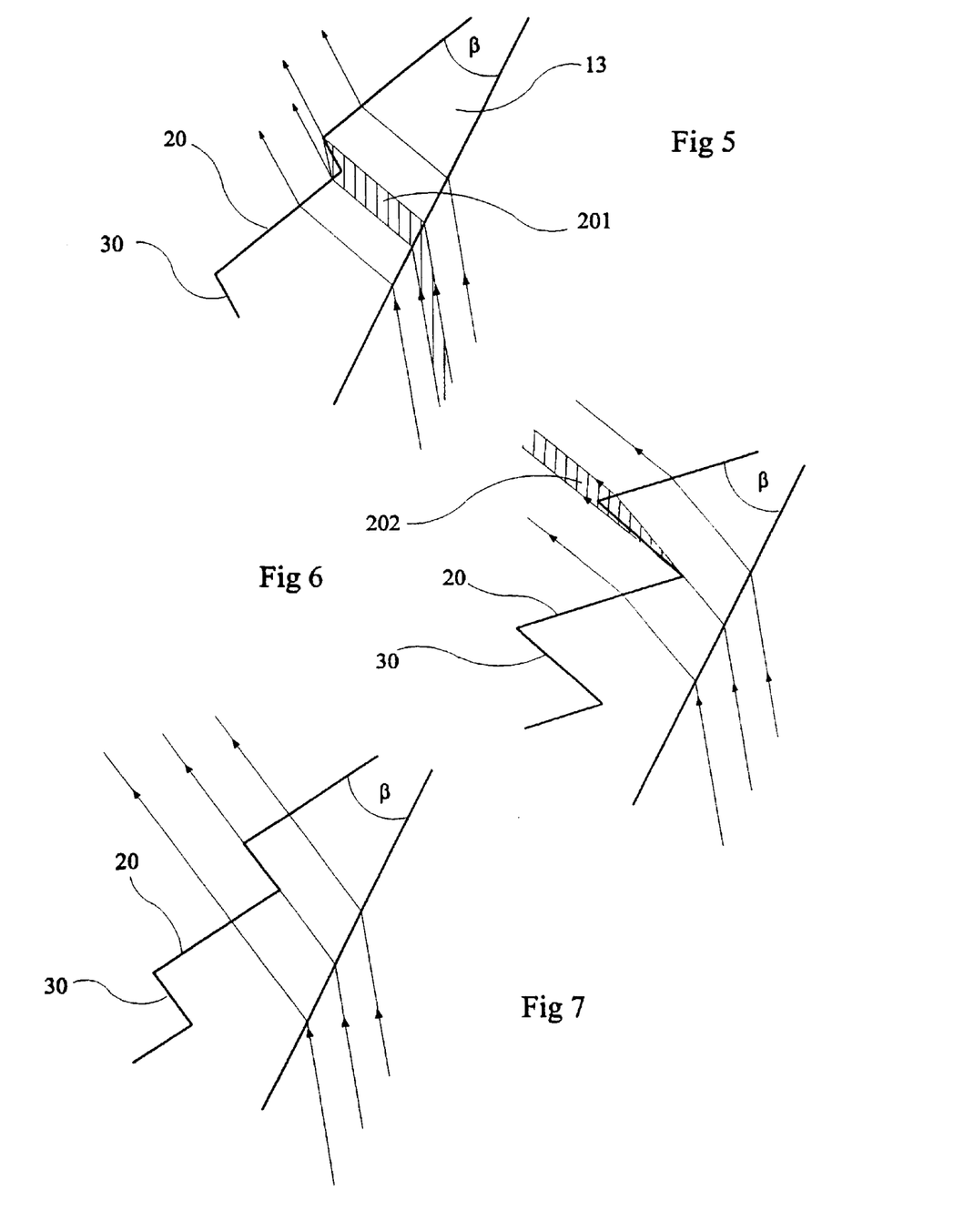
FIGS. 5, 6, and 7 illustrate the ray paths through different Fresnel refractors.

The practical limit to how large the apex angle of the refractors (angles β and δ) may acceptably be is determined by the influence of a feature of Fresnel prisms namely the riser facet. This influence is illustrated in FIGS. 5, 6 and 7.

In order to appreciate the significance of these Figures, it should be appreciated that the observer sees only the output rays when using the mirror. FIG. 5 illustrates a condition in which the prism apex angle β is smaller than it might usefully be. The hatched area 201, which includes the riser 30, is invisible to the observer, but the apex angle β may be made substantially larger before this advantageous condition is lost. In FIG. 6 the tapex angle β has been shown too large, and the hatched area 202, which contains only views of the riser, is visible to the observer. FIG. 7 shows the limiting condition between the previous two, which represents the maximum useful apex angle condition, normally about 30° for acrylic. This also defines the optimum riser angle, which may advantageously vary across the field of view.

Once the apex angle β of the objective refractor has been selected, the optimum apex angle β of the secondary refractor can be determined, based on the criterion of minimum chromatic aberration. For a 30° apex angle acrylic objective refractor 13 the apex angle of a polycarbonate secondary refractor 17 is about 15°. The optimum riser angle for the secondary prism 17 can be determined by raytracing, in similar fashion to the objective refractor, and it may also advantageously vary across the field of view.

Both refractors 13 and 17 may be manufactured in sheet form. Typically this might be a thin sheet of prism material which is cut to shape and laminated to a glass carrier. This method has been used successfully for prototype applications and is adaptable to volume production.

Elemental pitch of the Fresnel elements (that is the spacing of the riser crests) is not constrained by any of the foregoing optical criteria, but may be selected on the basis of manufacturing capability, possibly influenced by secondary optical considerations such as possible light scatter from the crests of the elemental prisms. Depending on the manufacturing method used, any pitch values in the range 0.1 mm to 5 mm might be considered appropriate.

The non-optical components required to install the rear view mirror system of the invention in a vehicle include a prism cell and mounting arrangement, and an adjuster and mounting arrangement for the reflector. Heating may be optionally provided.

Figure 8:
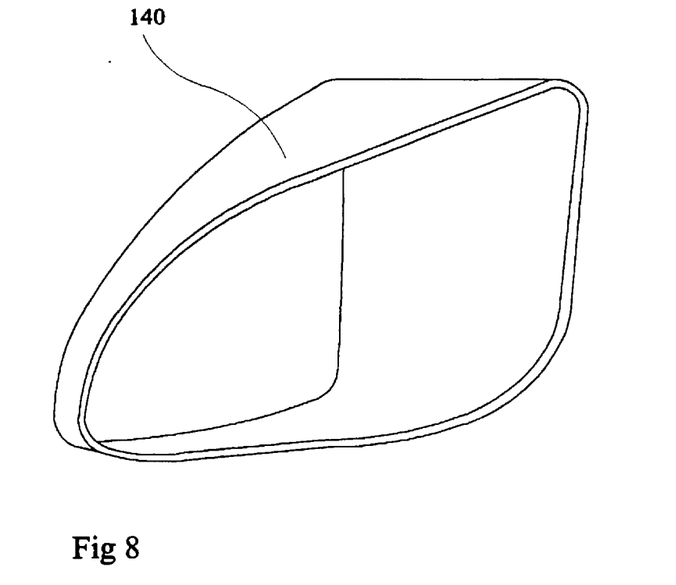
FIG. 8 is a perspective view of a carrier for holding refractors.

The prisms may be held in an injection moulded element that locates the prisms and protects their inner surfaces from damage and soiling. A typical practical cell structure is illustrated in FIG. 8 and identified 140. It provides a housing for the refractors as a sub-assembly with the refractors mounted within the interior of the cell 140 which is then sealed. The sub-assembly thereby formed is a robust structure having a durable shell formed by the cell 140 as required for the automotive assembly environment and the required life in service.

The perimeter of the objective refractor is preferably sealed into the outer skin of the vehicle for environmental reasons, the same sealing line nay be advantageously used to effect the mounting of the cell sub-assembly in the vehicle. The host component for this mounting may be a specially formed skin panel or a window.

The mirror adjuster may be an industry standard device fitted between the back of the reflector and a mounting bracket affixed either to the vehicle door or to a fixed part of the body structure such as the instrument panel.

Due to its interior location the ref lector experiences reduced aerodynamic and vibrational disturbances. In addition to producing an extremely stable image, this may is ;also permit the use of a smaller, lighter adjuster. The adjuster itself may be electrically powered or manually operated.

Figure 9:
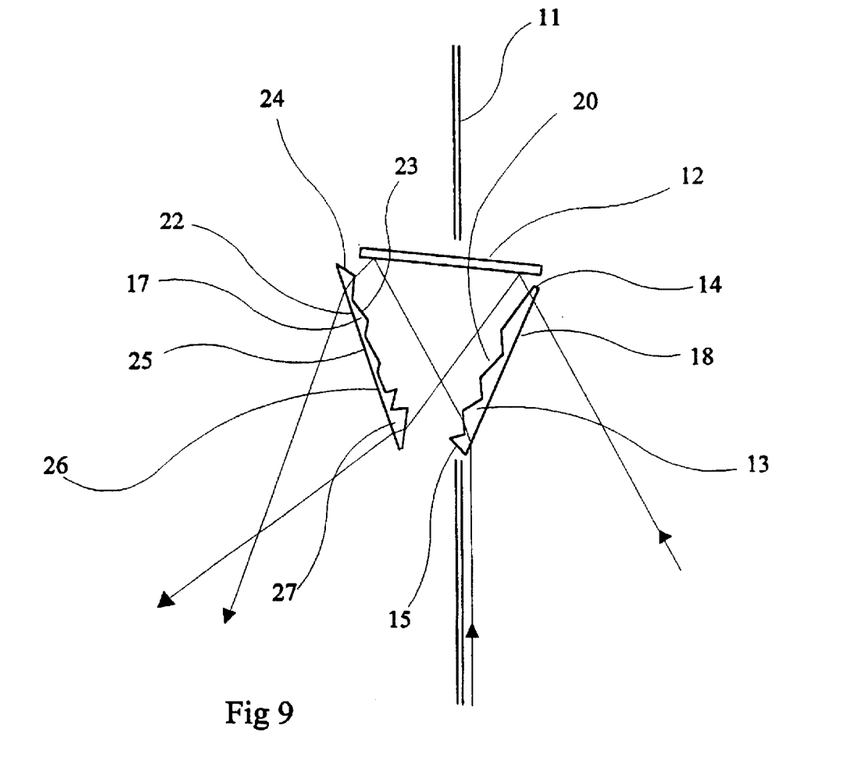
FIG. 9 is a schematic plan view from above of an alternative embo lment of the invention.

An alternative configuration is illustrated in FIG. 9. In FIG. 9 the same reference numerals have been used to identify components which are the same or fulfill the same functions as those in the embodiment of FIGS. 1 and 2. In this embodiment the reflector 12 and objective refractor 13 are geometrically related to the body side wall 11 of the vehicle in approximately the same configuration whereas the secondary refractor 17 is positioned to form a triangle spanning the rear end of the objective refractor 13 and the inboard end of the reflector 12. The objective refractor 13 has a plurality of Fresnel facets 20 which, as will be seen, are not of constant angular inclination with respect to the incident surface 18 as in the embodiment of FIG. 1, but rather are each individually inclined at a slightly different angle from its neighbour so that the "power" of the refractor varies from a high power at the rear end 15 to a relatively lower power at the forward end 14. Correspondingly, the facets 23 of the ocular or secondary refractor 17 likewise vary from a high inclination at the forward end 24 to a lower inclination at an intermediate point 25. Rearwardly from the point 25 the Fresnel facets pass through a first point 26 at which the facet is parallel to the exit face 22 of the secondary refractor 17, and thereafter the inclination of the facets reverses so that a facet 27 at the rearward end of the secondary or ocular refractor 17 is inclined in an opposite direction.

What is claimed is:

1. A low profile rear view mirror for a motor vehicle, comprising:
   a) a first refractor, said first refractor having a first refractive index and a first chromatic dispersive power;
   b) a housing for said first refractor on the exterior of said vehicle;
   c) a reflector, means moilting said reflector to lie partly within said motor vehicle, said reflector extending into said housing for said first refractor, said reflector being positioned to receive and reflect light from objects behind said vehicle passing through said first refractor;
   d) a second refractor, said second refractor having a second refractive index and a second chromatic dispersive power; said second refractor between said first refractor and said reflector, said first and second refractors having complementary properties of chromatic dispersion.

2. The optical rear view system of claim 1, wherein said first and second refractors are separate triangular prisms oriented with their apices in opposite directions from one another.

3. The optical rear view system of claim 1, wherein said first and second refractors have complementary geometric aberration properties such that said second refractor is formed of a material as at least partly to compensate for geometric aberrations introduced by said first refractor.

4. The optical rear view system of claim 1, wherein said first refractor has a relatively high refractive index and a relatively low chromatic dispersion, whilst said second refractor has a relatively low refractive index and a relatively high chromatic dispersion.

5. The optical rear view system of claim 4, wherein said first refractor is composed of an acrylic material and said second refractor is composed of a polycarbonate material.

6. The optical rear view system of claim 1, wherein said first and second refractors are so formed that the angle through which incident light is refracted upon transmission therethrough is different at different points over the surface of the refractor.

7. The optical rear view system of claim 1, wherein at least one of said first and second refractors is formed as a Fresnel prism.

8. The optical rear view system of claim 1, wherein there is a flrther compensating refractor in the path of light between the reflector and an observer.

9. The optical rear view system of claim 8, wherein both said first and second refractors are formed as Fresnel prisms with the facets of each prism facing towards the other said prism.

10. The optical rear view system of claim 9, wherein said Fresnel refractors are in contact with one another.

* * * * *